(12) United States Patent
Remo et al.

(10) Patent No.: US 9,320,384 B2
(45) Date of Patent: Apr. 26, 2016

(54) COFFEE MACHINE WITH A REFRIGERATED COMPARTMENT

(75) Inventors: Gianni Remo, San Marcello Pistoiese (IT); Andrea Bruni, Granaglione (IT); Stefano Tonelli, Gaggio Montano (IT); Fabio Salvi, Granaglione (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 940 days.

(21) Appl. No.: 13/388,176

(22) PCT Filed: Jul. 21, 2010

(86) PCT No.: PCT/IB2010/053326
§ 371 (c)(1),
(2), (4) Date: Jan. 31, 2012

(87) PCT Pub. No.: WO2011/015963
PCT Pub. Date: Feb. 10, 2011

(65) Prior Publication Data
US 2012/0125202 A1 May 24, 2012

(30) Foreign Application Priority Data
Aug. 3, 2009 (IT) ................ FI2009A0177

(51) Int. Cl.
A47J 31/42 (2006.01)
A47J 31/44 (2006.01)
A47J 31/60 (2006.01)

(52) U.S. Cl.
CPC .............. *A47J 31/4485* (2013.01); *A47J 31/60* (2013.01)

(58) Field of Classification Search
CPC .................................................... A47J 31/4485
USPC ............ 99/280, 286, 287, 323.1, 323.3, 452, 99/453, 290, 293; 261/66, 72.1; 426/520; 62/389
See application file for complete search history.

(56) References Cited

U.S. PATENT DOCUMENTS

| 4,902,523 | A | * | 2/1990 | Fritchen et al. | ............... 426/231 |
| 6,183,800 | B1 | | 2/2001 | Van Straten et al. | |
| 6,253,667 | B1 | * | 7/2001 | Lussi et al. | ...................... 99/455 |
| 7,252,034 | B1 | * | 8/2007 | Eckenhausen et al. | ......... 99/293 |
| 2002/0121197 | A1 | | 9/2002 | Mercier | |
| 2007/0031558 | A1 | * | 2/2007 | Lussi | ............................ 426/520 |
| 2010/0011968 | A1 | * | 1/2010 | Fin et al. | ..................... 99/323.1 |

FOREIGN PATENT DOCUMENTS

| EP | 1132032 A2 | 9/2001 |
| EP | 1472963 A1 | 11/2004 |
| JP | 2002128197 A | 5/2002 |
| WO | 9100041 A1 | 1/1991 |
| WO | WO9523545 | * 9/1995 |

* cited by examiner

*Primary Examiner* — Dana Ross
*Assistant Examiner* — Joseph Iskra

(57) ABSTRACT

A connection device connects a refrigerated compartment, where milk or other perishable liquid is contained, to a device for supplying hot or emulsified milk, which can be associated to a coffee machine or the like. The connection device has at least a portion which can be refrigerated by an effect of a coupling to the refrigerated compartment where a milk container is contained.

25 Claims, 14 Drawing Sheets

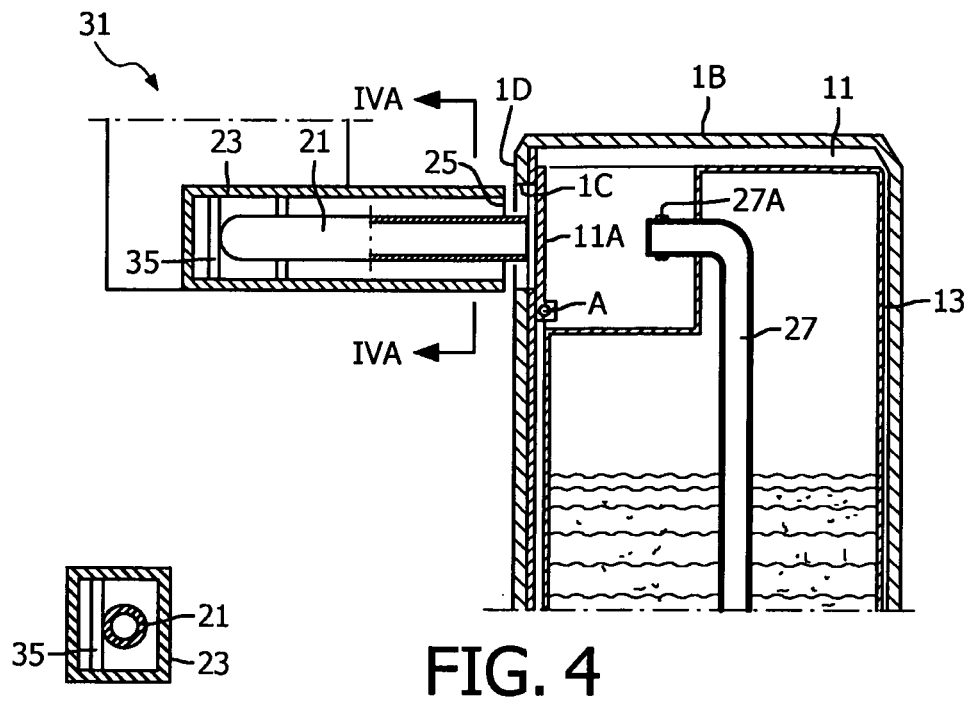
FIG. 4
FIG. 4A
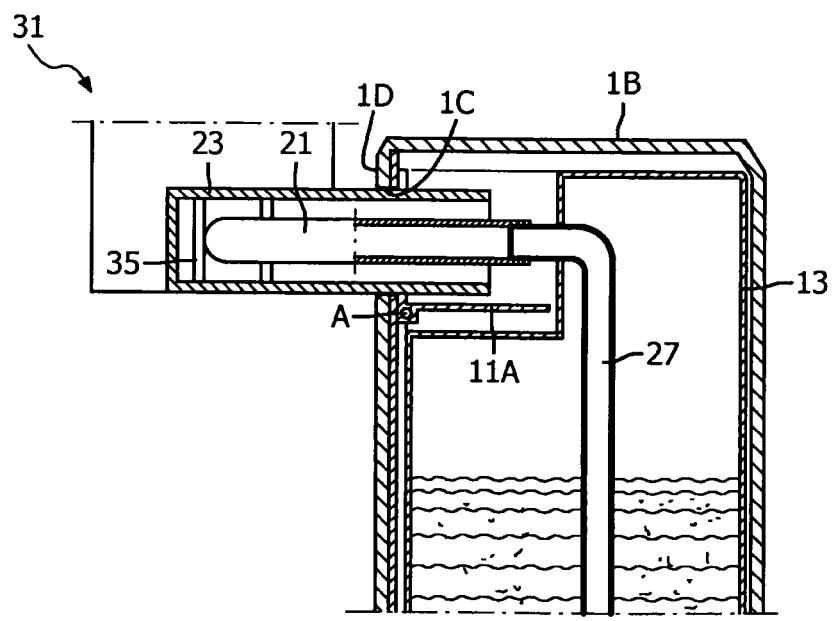
FIG. 5

COFFEE MACHINE WITH A REFRIGERATED COMPARTMENT

FIELD OF THE INVENTION

The present invention relates to improvements to machines for producing drinks. In particular, but not exclusively, the present invention relates to improvements to the coffee machines of automatic or semiautomatic type, for domestic or professional use, comprising means for supplying hot and/or emulsified milk.

STATE OF ART

The modern coffee machines for domestic and professional use provide a housing wherein a brewing unit is arranged fed by hot, in case pressurized, water, for extracting the aroma from coffee powder which is loaded loose or under the form of a single-dose packaging (capsule, cartridge, pod, etc.) inside a brewing chamber. The machine is equipped with one or more nozzles for supplying coffee placed above a plane for resting a small cup or other container wherein the produced drink is to be collected.

In some machines the possibility of supplying hot milk or emulsified milk is also provided, for example for producing cappuccino, milk with a dash of coffee or other milk-based drinks or milk and coffee. To this purpose, some machines are equipped with a refrigerated compartment, placed near the main body of the machine containing the brewing unit. The refrigerated compartment is connected to one or more nozzles for supplying hot or emulsified milk, placed at the end of a milk-supplying device. The milk emulsifying or heating procedure takes place by means of a mixing or emulsifying system, thereto steam in pressure produced by the coffee machine is fed. The emulsifying group usually has also an air inlet which can be opened or closed to produce alternatively milk foam or hot milk.

U.S. Pat. No. 6,183,800 describes a method and a device for producing milk foam or milk-based drinks, by using milk coming from a refrigerated group of the above-mentioned type and using an emulsifying device fed by steam coming from the coffee machine to suck the milk from a container placed in the refrigerated compartment and supply emulsified milk or hot milk towards a cup.

The milk remaining in the feeding duct extending from the refrigerated compartment to the emulsifying device can deteriorate by the room temperature effect when the machine remains not working for a certain period of time.

Other devices for supplying hot milk or emulsified milk in coffee machines are described in WO-A-91/00041 and in EP-A-1,132,032.

SUMMARY OF THE INVENTION

According to an aspect, the invention provides the implementation of a machine for producing drinks, especially for producing coffee, with a device wholly or partially overcoming one or more drawbacks of the traditional machines.

The object of an embodiment of the invention is to obtain a device for connecting between a refrigerated compartment containing milk or other perishable or deteriorable liquid, to a device for supplying the liquid picked up from the refrigerated compartment, wherein the problem of the liquid deterioration caused by the room temperature is minimized.

Substantially, the connection device according to the invention comprises: a liquid-feeding duct having an end for inletting the liquid and housed at least partially in a refrigerated chamber; and a device for supplying the liquid. The supply device can comprise an outlet duct and a nozzle for supplying the liquid.

According to an aspect, the invention relates to a machine for producing drinks, in particular for example a coffee machine, comprising: at least a group for supplying a hot drink with at least a supplying spout; a refrigerated compartment to house a perishable food liquid; and a device for connecting between the refrigerated compartment and at least a nozzle for supplying the liquid picked up from the refrigerated compartment, wherein the connection device comprises a liquid-feeding duct, extending at least partially inside a tube in thermal contact with a refrigerated portion of the refrigerated compartment. Preferably the tube is made of a material with high thermal conductivity, for example a metallic material, preferably copper or aluminium. The perishable liquid feeding duct can be implemented in plastic material, such as silicone or the like, or generally a material suitable to the contact with food products. The possibility of implementing the feeding duct and/or the tube, wherein it is inserted, in steel is not excluded.

Advantageously, in some embodiments the refrigerated compartment comprises an evaporator for a refrigerating fluid, forming a coil, for example housed in a portion delimiting said refrigerated compartment. In some embodiments the tube wherein the perishable liquid feeding duct is contained is in thermal contact with the coil or evaporator of the refrigerating circuit. For example, the evaporator can be partially formed by or contained in a plate defining the inner surface or portion of the inner surface of the refrigerated compartment. The tube can be applied on such surface. In preferred embodiments, the tube for housing the perishable liquid feeding duct is mechanically coupled to a joint, in turn in direct or indirect thermal contact with the coil or evaporator of the refrigerated compartment. The tube is coupled for example in a reversible way to the joint, so as to be able to be removed together with the perishable liquid feeding duct, in order to perform cleaning operations.

In some embodiments, a device for the forced feeding of refrigerated air can be associated to the tube. Preferably the air is fed in a hollow space between the tube and the feeding duct. For example to this purpose a fan picking up the air from the refrigerated compartment can be provided and it feeds it through the joint connecting the tube, wherein the perishable liquid feeding duct is partially enclosed.

Advantageously the tube containing the perishable liquid feeding duct extends from the refrigerated compartment as far as a sucking and/or emulsifying member. From this one a duct connecting towards one or more supplying nozzles extends. The connecting duct can extend as far as one or more nozzles positioned near spouts for supplying the drink (for example coffee) produced by the machine, so that the drink can be supplied directly in one or more cups together, before or after the supply of the perishable liquid sucked from the refrigerated compartment, without the need of moving the cup.

The device for connecting from the refrigerated compartment to the supply nozzle can comprise a refrigerated chamber, properly limited by walls with low thermal conductivity. In some embodiments, the perishable liquid feeding duct, in turn enclosed inside the tube in thermal connection with the evaporator or the coil of the refrigerating circuit of the refrigerated compartment wherein the perishable liquid is contained, extends inside the refrigerated chamber.

In this way a device is obtained wherein the perishable liquid feeding duct is kept at a temperature proximate the one existing inside the refrigerated compartment, thanks to the cooling obtained through the tube enclosing the duct and the masking effect obtained with the outer wall enclosing the tube and the duct. The efficiency is increased by the possible presence of a system of forced circulation of refrigerated air. Preferably, as indicated above, the air is fed only in the hollow space between the tube and the perishable liquid feeding duct.

In some embodiments, the device comprises a thermally insulated outer housing, inside thereof the refrigerated chamber develops wherein the liquid feeding duct extends.

In some preferred embodiments of the invention the refrigerated chamber is open at least at the inlet end of the feeding duct, so that the inner volume thereof is placed in communication with the refrigerated compartment containing the milk or other perishable liquid when the connecting device is interfaced with the refrigerated compartment. This contributes to refrigerate by convection the refrigerated chamber.

Preferably the liquid feeding duct is implemented at least partially in material with high thermal conductivity, for example in metal, typically in steel, aluminium or other compatible metal with the features of the edible liquid which has to be fed through said feeding duct.

According to preferred embodiments of the invention, the duct for feeding the liquid, typically milk, is in flow connection with a sucking or emulsifying member having an inlet for feeding steam in pressure and a chamber for mixing the steam with the liquid fed along said feeding duct. The sucking or emulsifying member can properly comprise even an air inlet. It is typically interposed between the feeding duct and the device for supplying the liquid and it has the function of producing the effect of sucking the liquid (milk or other), the heating thereof and in case the emulsifying procedure thereof with air to obtain a foam.

In some embodiments, the sucking or emulsifying member comprises a Venturi tube, wherein a depression is created by the effect of inletting steam in pressure, said depression causing the liquid sucking in said liquid feeding duct.

In some improved embodiments of the invention, the device further comprises a closing member, for example a rotating tap, to close at least partially the liquid feeding duct, to allow washing the supply nozzle, that is the duct for outletting or supplying the liquid, downstream of the sucking member.

In some embodiments the feeding duct is housed in a substantially rigid outer, preferably thermally insulated casing. Similarly, even the outlet duct is housed in a substantially rigid outer casing. The outlet duct and the supply nozzle can assume at least two and preferably three different angular positions with respect to the feeding duct. The mutual rotation of the duct for feeding and outletting the liquid causes alternatively the at least partial opening and closing of the feeding duct. For example, this mutual rotation can cause the opening and closing of a member for intercepting the flow through said feeding duct. According to advantageous embodiments, the two portions comprising the supply nozzle and the liquid outletting duct and the liquid feeding duct are mutually connected approximately at the sucking or emulsifying member.

In some embodiments the device can be equipped with a discharge collecting device, with an inlet opening, which can be interfaced with the liquid supplying nozzle, and a discharge opening which can be interfaced with a collection container.

According to another aspect, the invention relates to a machine for producing drinks comprising: at least a group for supplying a hot drink, typically coffee, with at least a spout for supplying the drink; a refrigerated compartment to house a perishable food liquid, typically milk; an interface for coupling between the refrigerated compartment and a connection device of the type described above. When the connection device is coupled to the refrigerated compartment, the liquid feeding duct arranges with the liquid inlet end inside the refrigerated compartment and the liquid supply nozzle at the end of the liquid outlet duct can be arranged near the spout(s) for supplying the drink.

Additional advantageous embodiments and features of the device and the machine according to the invention are described hereinafter by referring to some embodiment examples and in the following claims forming integral portion of the present description.

BRIEF DESCRIPTION OF THE DRAWINGS

The invention will be better understood by following the description and the enclosed drawing, which shows a practical not limiting embodiment of the invention. More in particular, in the drawing:

FIGS. 4 and 5 show the phases for coupling the device to the refrigerated compartment;

FIG. 4A is a local section according to A-A of FIG. 4;

DETAILED DESCRIPTION OF EMBODIMENTS OF THE INVENTION

Hereinafter specific reference to a machine with a refrigerated tank for the milk housing will be made. However it must be understood that at least some of the advantages and of the features of the device according to the invention can be exploited even for supplying other types of perishable liquids.

Figure 1:
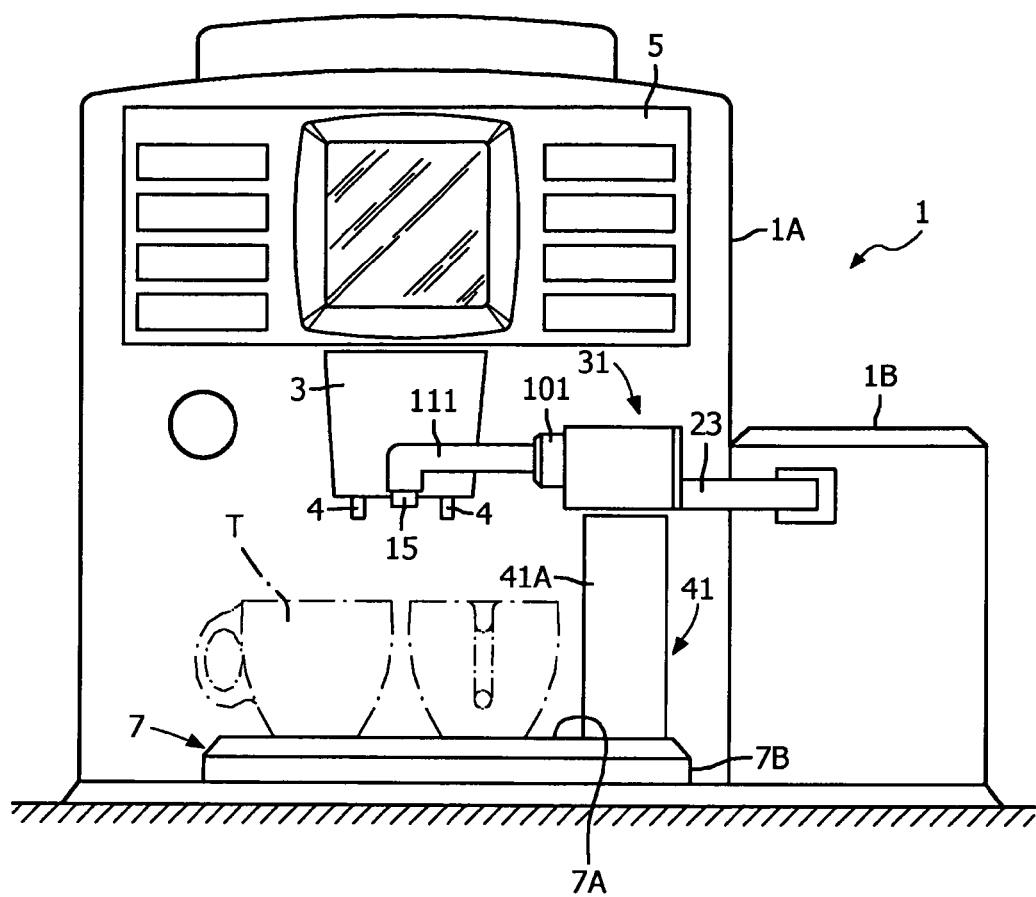
FIG. 1 shows a front view of a coffee machine comprising a refrigerated compartment for a container of milk or the like, equipped with a device according to the invention, connecting the refrigerated compartment to a supply nozzle.
Figure 2:
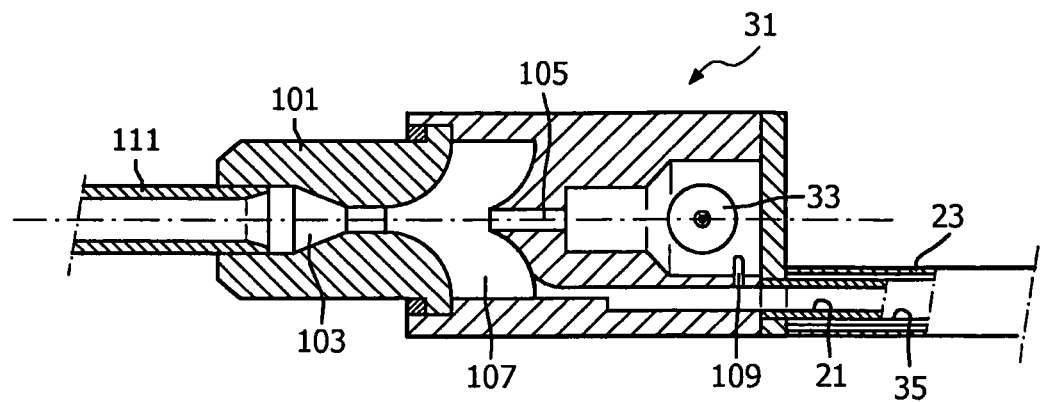
FIGS. 2 and 3 show longitudinal sections, in two different embodiments, of an emulsifying group inserted in the device of the invention.

In FIGS. 1 and 2 an automatic coffee machine is generically designated with 1, comprising a main body 1A, wherein a brewing unit, known on itself and not shown, is housed. The brewing unit is fed with hot water coming from at least a boiler, not shown too. The machine can have a system for feeding capsules or single-dose pods, a tank of loose ground coffee, a tank of coffee beans with a milling group to mill instantaneously the coffee necessary for each drink brewing cycle, or any other system known for loading coffee in the brewing chamber. The coffee is supplied through a supplying group 3 arranged on the front side of the machine, in the illustrated example below a panel 5 therewith the operator controls the machine operation. The supply group 3 can have one or more coffee supply spouts, schematically designated with 4, in flow connection with the brewing unit and arranged above a plane 7 for resting the small cup or other container wherein the drink is supplied.

A refrigerator 1B, defining a refrigerated compartment 11 (FIGS. 4 and 5), wherein a tank 13 of milk can be contained, is arranged near the main body 1A. The tank 13 can be a carafe, a bottle, a bag or any other tank suitable to contain milk.

The milk has to be picked up from the tank 13 contained in the refrigerated compartment 11 to be supplied in a cup or other container T after having been heated and in case emulsified. The supply takes place through a supply nozzle 15 constituting the outlet end of a milk outlet duct and placed at a final end of a device 17 for connecting between the supply nozzle 15 and the tank 13 of the milk. When the device 17 is connected to the machine 1 and to the refrigerator 1B, the supply nozzle 15 is near the group 3, so that milk and coffee can be supplied in the same cup T placed onto the plane or grid 7, without the need of moving the cup. The machine can be programmed to perform cycles for supplying coffee, or cappuccino, or milk with a dash of coffee or still hot milk or emulsified milk without coffee, according to known techniques.

In an embodiment, the connection device 17 comprises a duct 21 for feeding milk from the refrigerated compartment 1B towards a sucking and/or emulsifying member designated as a whole with 31, placed in the central area of the device 17 and described hereinafter. In this embodiment, the sucking member is constituted by an emulsifying device, that is a member which can even perform the liquid emulsifying in order to obtain for example milk foam.

The feeding duct 21 develops inside a preferably thermally insulated chamber 23. An end, designated with 25, of the feeding duct 21 (FIGS. 4 and 5) forms a coupling or connection to a milk picking-up tube or sucking tube 27 extending inside the milk tank 13 towards the bottom thereof. In the illustrated example (see FIGS. 4 and 5), the sucking tube 27 has gaskets 27A to allow a sealing connection between the end 25 of the feeding duct 21 and the sucking tube 27.

Figure 3:
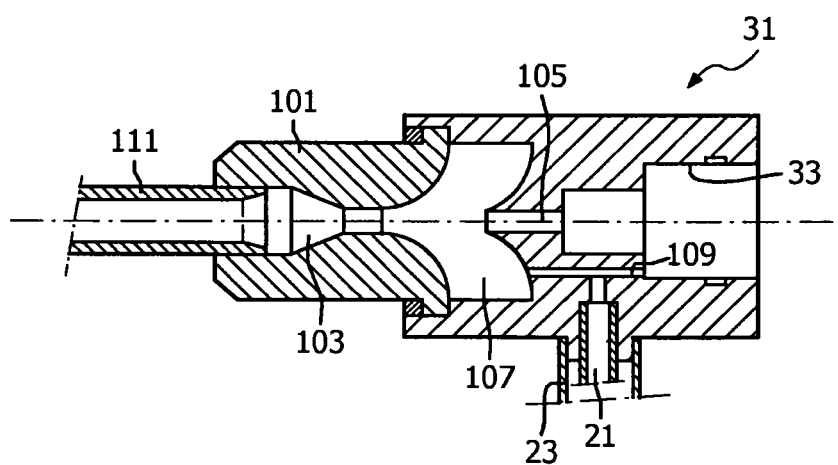

As indicated above, along the development of the device 17 there is an emulsifying device 31 the function thereof is to heat milk and in case to emulsify it with air to form a milk foam. FIGS. 2 and 3 show schematically and in longitudinal section two embodiments of the sucking and emulsifying member 31.

The sucking and emulsifying member 31 has a joint 33 which can be coupled to a corresponding nozzle for supplying steam, implemented on the body 1A of the machine and in connection with members for the controlled supply of steam and of air. The sucking and emulsifying member 31 is implemented in a known way and illustrated in greater detail in FIGS. 2 and 3 in two embodiment examples.

By referring to FIG. 2, the emulsifying member 31 comprises a body 101 within thereof a Venturi tube 103 is provided. The tube Venturi 103 is fed with steam in pressure through a nozzle 105 which is in flow connection with the joint 33. An emulsifying chamber 107 is provided between the nozzle 105 and the inlet of the Venturi tube 103, wherein a depression is created when the nozzle 105 feeds steam in pressure to the Venturi tube and in this a steam flow with high speed is triggered off.

The milk feeding duct 21 flows into the emulsifying chamber 107. The milk is sucked through the feeding duct 21 by the effect of the depression produced by the steam flow in the Venturi tube. In the emulsifying chamber 107 even air can be sucked, for example through a duct connected with outside, or through a duct (schematically designated with 109) in connection with a joint implemented on the body 1A of the machine 1. In this second case the air is fed from the inside of the machine and an electrovalve controlled by the central unit of the machine 1 can be used to open or close the air feeding, so as to form emulsified milk (with the open air) or hot milk (with the closed air). Even a system for adjusting the steam quantity and/or the air quantity to modify the emulsion features can be provided.

The air and steam mix only in the emulsifying chamber 107, whereas upstream the two air and steam ducts remain separated, being connected to two separated steam and air feeding lights coming from the machine 1.

FIG. 3 shows an embodiment variant of the sucking and emulsifying member 31. Equal numbers designate portions equal or equivalent to those shown in FIG. 4A.

An outlet duct 111, ending with the supply nozzle 15, forming a milk supplying device, is connected to the outlet of the Venturi tube 103. Hot milk or milk foam is supplied through the outlet duct 111 depending if in the emulsifying device 31 only milk or milk and air is sucked.

The operation of an emulsifying device of this type is known on itself and it is summarized as follows. When one wishes to supply hot milk and emulsified milk through the nozzle 15, steam in pressure is inlet in the emulsifying member 31. The steam high speed in the Venturi tube produces in the emulsifying chamber 107 a depression which sucks milk from the feeding duct 21 and in case air if the duct 109 of the air is open. In the first case only hot milk is fed to the nozzle 15, heated by means of the steam, in the second case emulsified milk is fed, that is milk foam.

Thanks to the connection between the device 17 and the refrigerator 1B at least the tract of the feeding duct 21 between the end 25 and the emulsifying device 31 is kept at a lower temperature with respect to the room temperature. In fact, as it is noted in particular in FIGS. 4 and 5, once the device 17 has been connected to the machine, the inside of the chamber 23 is in connection with the inside of the refrigerated compartment 11 and the chamber 23 can be filled with cold air. The end 25 of the feeding duct 21 projects inside the refrigerated compartment 11 and, above all if this duct tract is made in metal or other material with high thermal transmission coefficient, the temperature of the whole feeding duct tract 21 up to the emulsifying device 31 can be lowered. As it can be noted in FIG. 4A, a plate 35 forming thermal flywheel can be associated to the feeding duct 21 in order to keep at low temperature the duct itself. The chamber 23 can be defined by thermally insulating walls in plastic, in case insulated material.

The possibility of placing the plate 35, or the duct 21 or other components with high thermal conductivity with a member kept at low temperature, for example refrigerated directly by the cold source keeping at low temperature the refrigerated compartment 11, is not excluded. For example, one or more cells with Peltier effect could be provided in mechanical connection with the plate 35 or directly with the feeding duct 21 when this is engaged.

The refrigerated compartment 11 has a door 11A which can be kept closed (FIG. 4) through a spring placed onto the oscillating axis A of the door 11A when the device 17 is not connected to the machine. The connection of the device 17 to the machine and to the refrigerated compartment takes place simply by inserting the ending portion of the device itself within an opening 1C implemented in the front wall 1D of the body 1B causing the oscillation downwards the door 11A.

Figure 6A:
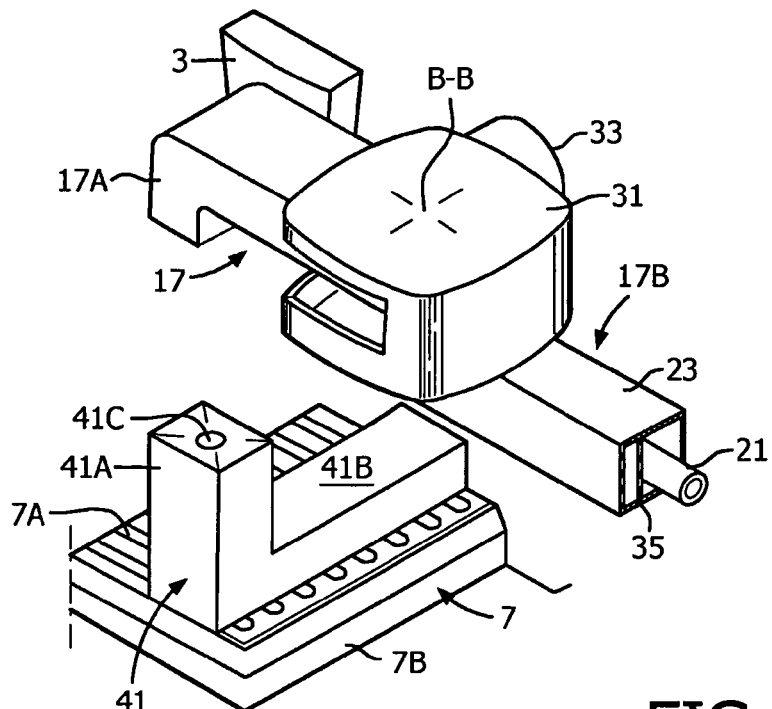
FIGS. 6A and 6B show perspective views of a modified embodiment of the invention in two different positions, respectively for supplying milk and for washing.
Figure 6B:
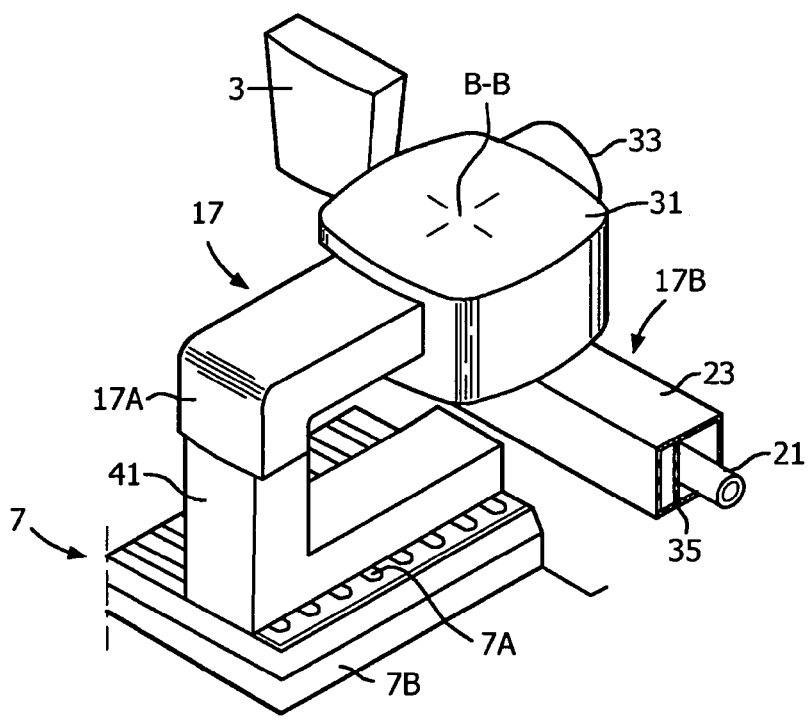
Figure 7:
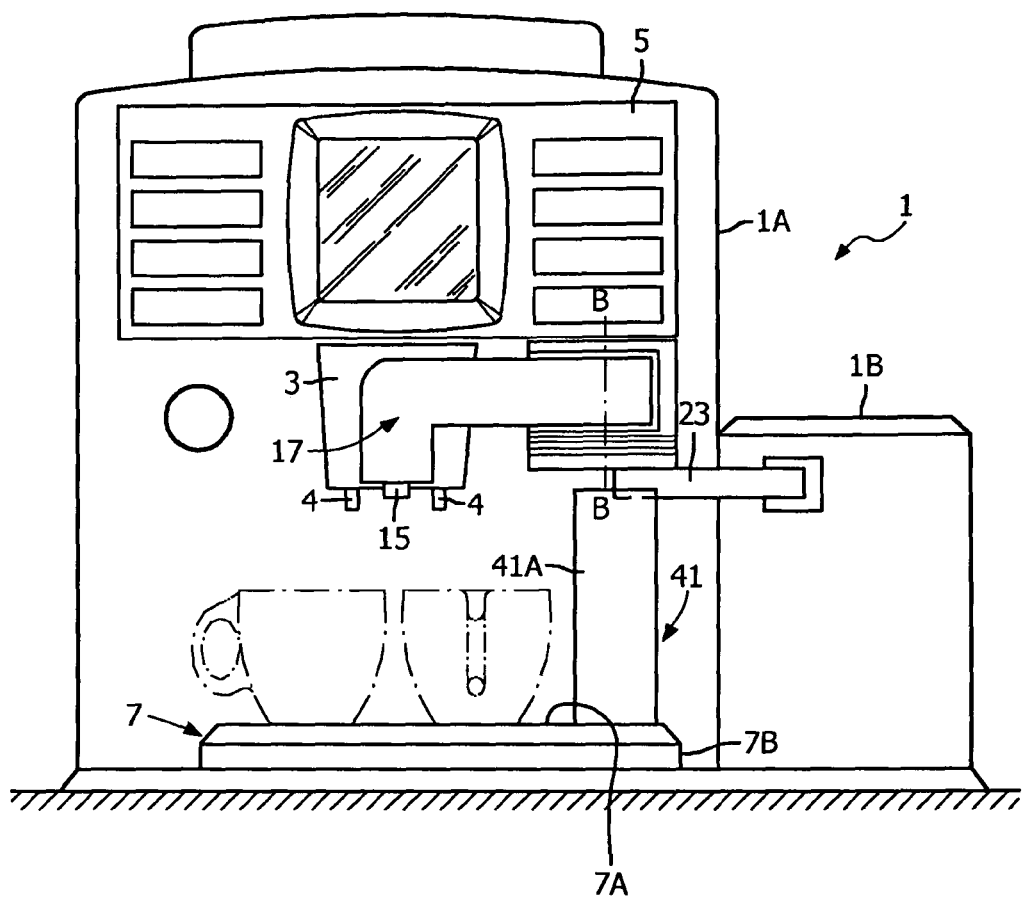
FIG. 7 shows a front view of the coffee machine with the device of FIGS. 6A, 6B connected thereto.
Figure 8:
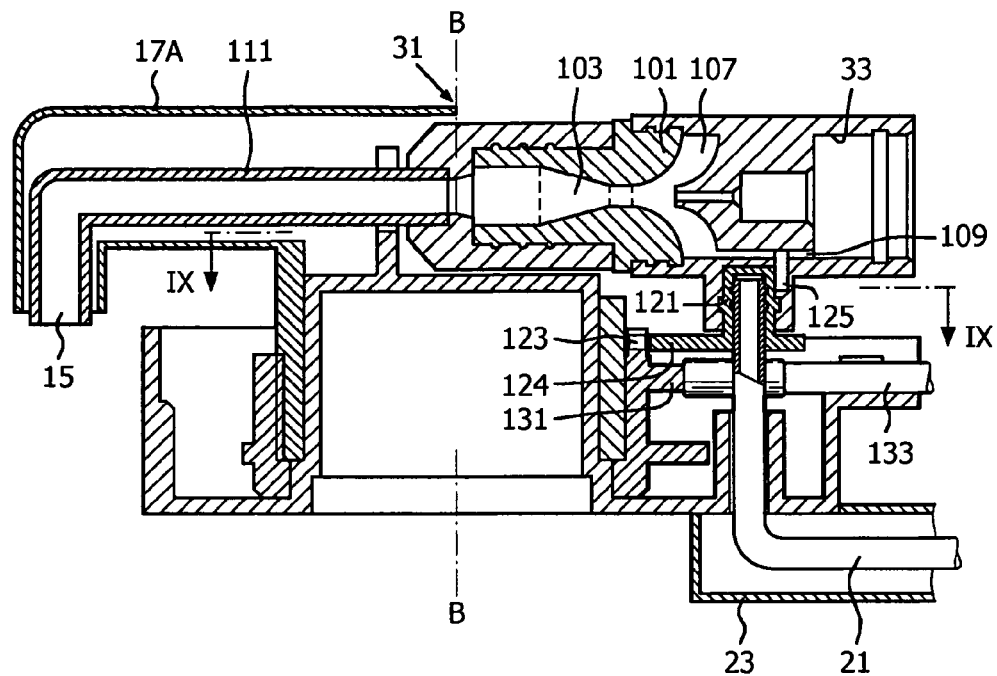
FIG. 8 shows a longitudinal section of the emulsifier of the device of FIGS. 6A, 6B in washing position.

FIGS. 6A and 6B show in perspective a modified embodiment of the invention. Equal numbers designate portions equal or equivalent to those described by referring to FIGS. 1 to 5. In this embodiment example the device 17 is formed in two portions 17A and 17B articulated therebetween around an intermediate axis B-B, preferably positioned at the sucking and emulsifying group 31. A discharge collector 41, which in the assembled position has a vertical portion 41A and a horizontal portion 41B is arranged onto the plane or grid 7, which is equipped with openings 7A and is arranged above a small collecting basin 7B. The vertical portion 41A ends with an opening 41C arranged so that the supply nozzle 15 of the device 17 arrives above the hole 41C when the portion 17A of the device 17 is in the position of FIG. 6B. This is a washing position, wherein the device 17, and more precisely the emulsifying device 31 and the duct 111 extending therefrom to the nozzle 15, are washed by a flow of hot water and/or steam coming from the machine 1.

As it will be described in greater detail by referring to the following figures, an intercepting member, actuated by the rotation of the portion 17A with respect to the portion 17B to close the flow connection between the feeding duct 21 and the emulsifying device 31, is placed inside the device 17. The feeding duct 21 is intercepted, that is closed, when the portion 17A is rotated in the position of FIG. 6B and the supply nozzle 15 is at and above the hole 41C of the collector 41. In this position, then, when steam or hot water is inlet into the emulsifying device or sucking member 31 the washing of the emulsifying device itself and of the outlet duct 111 as far as the supply nozzle 15 is obtained, whereas the duct 21 feeding the milk is insulated from the emulsifying device 31, so that the milk is not sucked by the Venturi tube 103.

FIGS. 8, 9 and 10, 11 show in two different positions the central portion of the device 17A, 17B. In particular the area of the emulsifying device 31 and the intercepting member closing the flow passage between the feeding duct 21 and the emulsifying device 31 is shown. Equal numbers designate portions equal or equivalent to those described by referring to FIGS. 2 and 3.

In this embodiment example a tap 121 is arranged at the final end of the feeding duct 21, which allows opening or closing the duct itself, by insulating it from the sucking member 31 when the device 17 has to be washed. The portion 17A of the device 17 has a pin 123 rotating with the portion 17A around the axis B-B and which is engaged by means of a fork 124 to the tap 121, so that the rotation of the portion 17A causes the opening and closing rotation of the tap 121. The latter is implemented in form of a cylindrical member with closed bottom and with at least a side light 121A which, depending upon the angular position assumed by the tap 121, places in flow connection the feeding duct 21 with a flow passage 125 towards the emulsifying chamber 107, or it insulates the feeding duct 21 from said chamber 107 and then from the Venturi tube 103.

Also cam profiles 131 are integral to the portion 17A of the device 17, which act onto stems 133, by causing the selective axial shifting of the stems themselves, depending upon the mutual angular position between the portions 17A and 17B of the device 17. The stems 133 constitute actuating members cooperating with sensor members of the coffee machine 1 (non shown), so as to provide to the central unit of the machine itself information about the presence and the position of the device 17. The sensor members can comprise: microswitches, optical readers, capacitive sensors, REED sensors, sensors with Hall effect or other suitable sensor members or detection members or combinations thereof. In this way, simply by rotating the portion 17A of the device 17 by about 90° from the position of FIG. 6A (milk supply) to the position of FIG. 6B (washing) it is possible providing a signal consenting to the washing, which is then activated by the user through the interface 5 of the machine. Alternatively, it is possible providing that the microswitch or other sensor member activated through the respective stem 133 provides directly the signal for activating the washing cycle without the need for additional intervention of the user.

The washing cycle can consist in inletting the steam and/or hot water through the joint 33 and/or through the light or opening 109 of the air. With the feeding duct 21 closed by the tap 121 the steam and/or hot water flow does not cause the sucking of milk which remains in the refrigerated portion 17B of the device 17, but flows in all areas downstream of the tap 121 as far as the nozzle 15 by eliminating milk residues from the not refrigerated portion. As this washing cycle is activated only if the portion 17A is rotated until bringing the supply nozzle 15 above the opening 41C, the steam and the washing water, with the milk residual are collected and conveyed towards the grid 7 and then to the small basin 7B underneath thereof.

In this configuration, then the device 17 allows keeping a connection between the refrigerated compartment 11 and the supply nozzle 15 by maintaining at low temperature the whole milk existing in the circuit as far as the sucking and emulsifying member 31, and at the same time it allows washing the ending portion of the device, by collecting in an efficient way the washing fluid and the removed milk residues, by avoiding steam and/or water sprays in the surrounding environment. Moreover, the possibility of eliminating the discharge collector 41 is not excluded, although this involves the loss of the advantage derived from directly conveying the washing fluid in the small basin 7B underneath the grid 7.

In some embodiments it can be provided that the device can perform even a washing cycle of the duct 21 feeding the milk, extending from the end 25 as far as the emulsifying member 31. The washing cycle of this portion of the milk sucking duct takes place advantageously by separating the end 25 from the sucking tube 27. The cycle for washing the feeding duct 21 takes place by bringing the device in the position of FIG. 12. In this position a second side light 121B of the tap 121 arrives at the passage of the fluid 125. In such way, by supplying hot water and/or steam to the emulsifying device 31 through the nozzle 105 and/or through the light 109 for feeding air, the passage of the water and/or the steam through the milk duct in the opposed direction with respect to the milk sucking direction is obtained, in order to clean the duct itself as far as the end 25.

Figure 9:
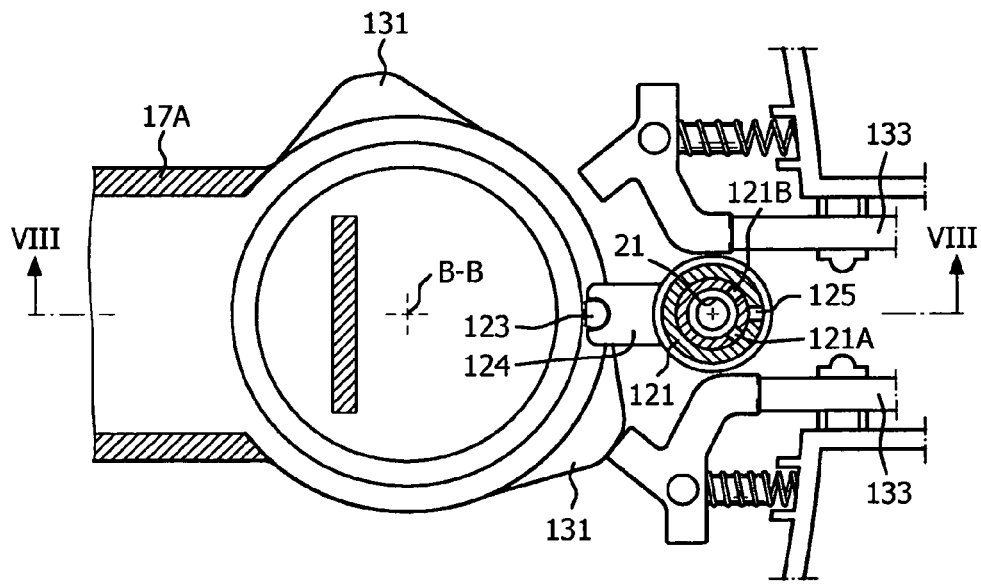
FIG. 9 shows a partial and simplified section with removed portions, according to the line IX-IX of FIG. 8; le
Figure 10:
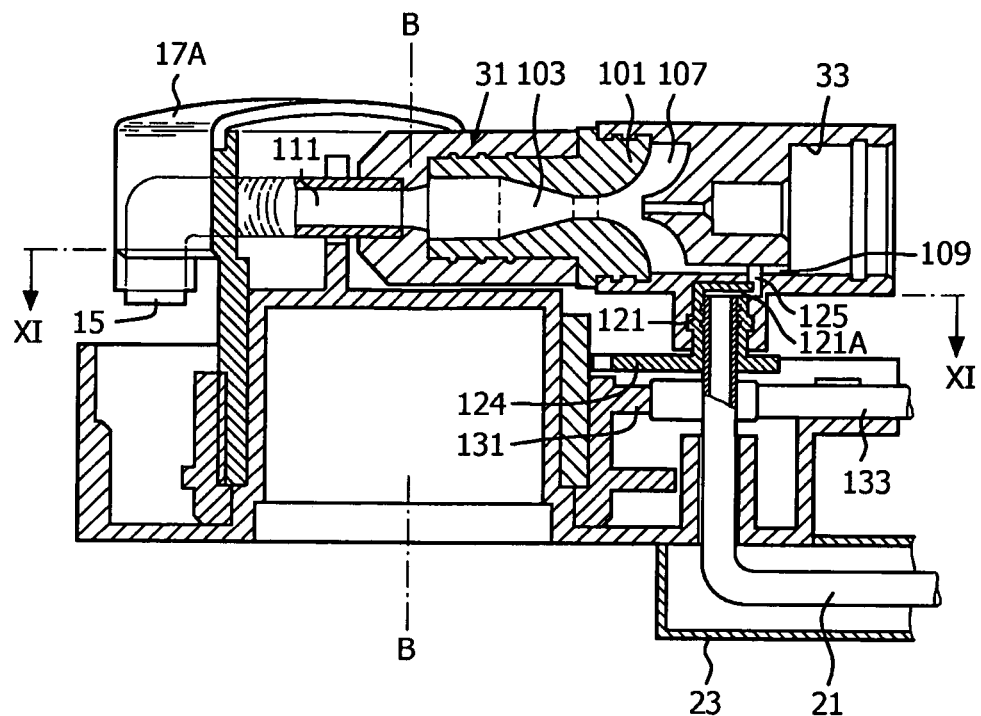
FIGS. 10 and 11 show sections similar to those of FIGS. 8 and 9, in position of supplying the milk.
Figure 11:
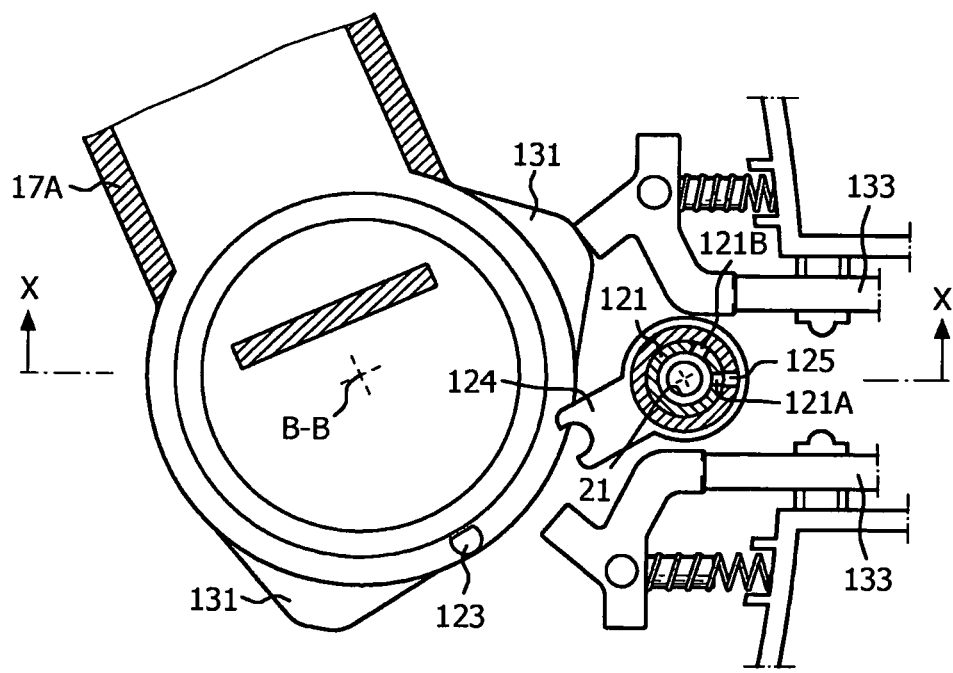
Figure 12:
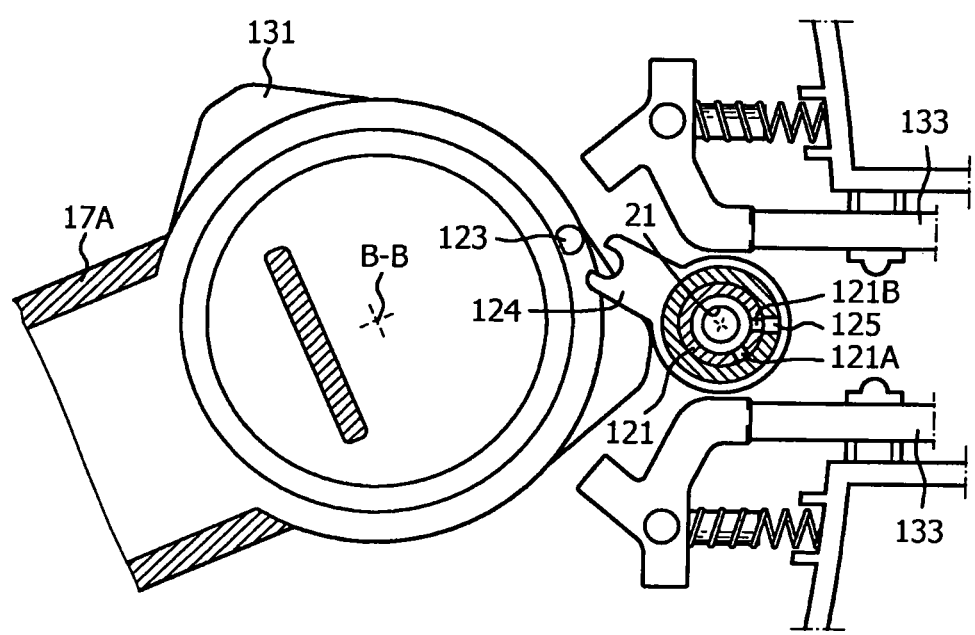
FIG. 12 shows a section similar to that of FIG. 11, with the device in position for washing the milk sucking duct.

As it is noted from the comparison between FIGS. 9, 11 and 12, in this third position the stems 133 are in a different position with respect to both the washing position of the emulsified milk supplying nozzle and to that of emulsifying and supplying milk, thanks to the shape and to the position of the cams 133. The sensor members (microswitches or others) associated to the stems 133, 133 can then detect the three different positions of the device 31 (washing of the supply duct 111, washing of the feeding duct 21, supply of hot or emulsified milk) and provide such information to a control central unit of the coffee machine thereto the device 17 is associated, to allow the user to perform one or the other one of the three operations mentioned above.

FIGS. 13 to 22 show an improved embodiment of the machine according to the invention. The machine is still designated as a whole with 1 and equal numbers designate numbers equal or equivalent to those of the embodiments shown FIGS. 1 to 12.

Figures 13A, 13B, 13C:
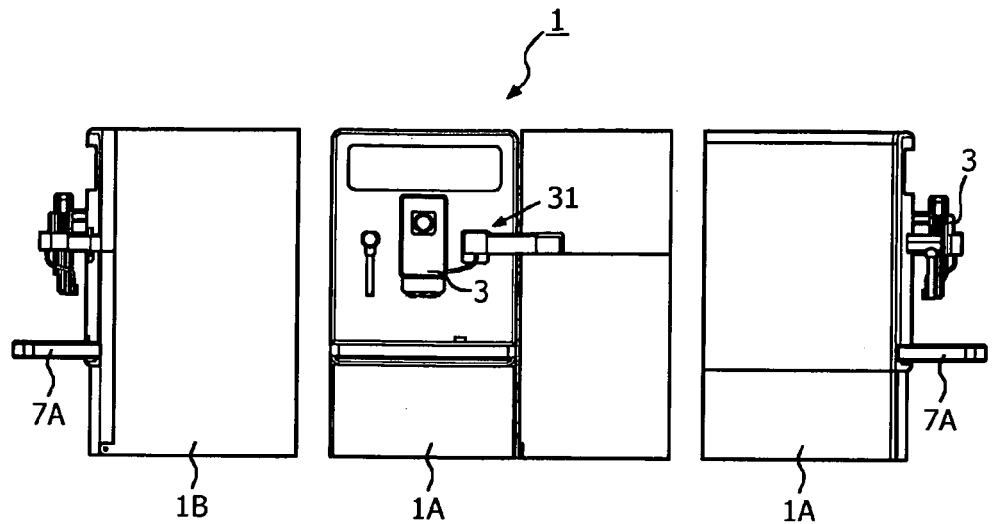
FIGS. 13 and 14 show a coffee machine according to the invention in an improved embodiment.

In particular FIG. 13 shows a front view and two side views of the coffee machine designated as a whole with 1, wherein 1A designates the main body and 1B the refrigerator. The latter defines inside thereof a refrigerated compartment designated with 11, closed with an oscillating door or panel 11A which closes the whole lower portion of the refrigerated compartment 11. Inside the latter, a milk tank 13 is inserted wherein a milk feeding duct, designated with 21, picks out which feeds the milk towards the nozzle 15 (FIG. 19) which is at the end of the outlet duct 111 of the device 17 for connecting the tank 13 to the nozzle 15. The latter is associated to the supplying group 3 of the coffee machine 1, in turn, equipped with two coffee supply spouts 4. The nozzle 15 can have too a double outlet, to supply the milk picked up from the tank 13 in two different positions substantially corresponding to the supplying spouts 4, so as to be able to supply milk and coffee in two cups positioned onto the grid 7A. Alternatively even one single nozzle, or two adjacent nozzles, in different position with respect to the position of the coffee supply spouts 4 can be provided.

In some embodiments, the milk feeding duct 21 is made of silicone or other flexible material suitable to the contact with the food products. It has a first end in the tank 13 and a second end, designated with 21A in FIG. 19, connected to a light inletting milk into the emulsifying group 31 substantially equivalent to the emulsifying or sucking group 31 described with reference to the previously illustrated embodiments.

Figure 19:
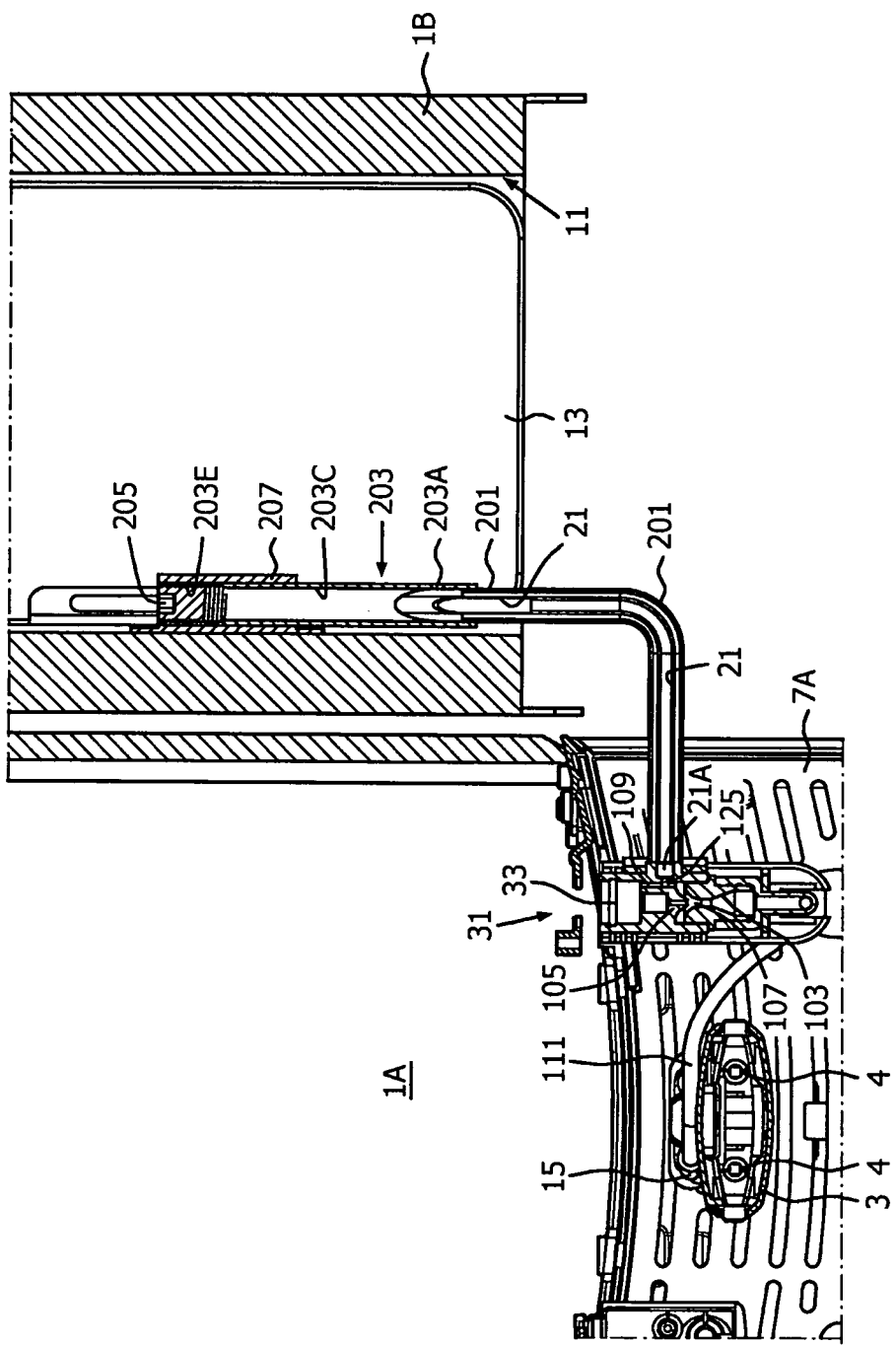
FIG. 19 shows a section according to a horizontal plane passing through the median axis of the Venturi tube inserted in the sucking member.

As it can be seen in particular in FIG. 19, the emulsifying member 31 has a Venturi tube 103 aligned axially to a steam nozzle 105 in connection with an inlet or joint 33 engaged onto a steam and air supplying device therewith the machine 1, not shown in figure, is equipped. The light or the duct for feeding air from the inside of the machine is designated with 109. The light 109 intersects the fluid passage 125 therethrough the milk fed by the feeding duct 21 enters. The emulsifying air fed by the light 109 mixes then with the milk sucked through the duct 21 before entering the mixing chamber 107 wherein the air and milk emulsion mixes with the steam. In a way known on itself, the hot steam in pressure fed through the nozzle 105 produces in the Venturi tube 103 a depression which allows to suck both air through the light 109, and the milk through the feeding duct 21. Therefore, emulsified milk is produced which, through the duct 111, is sucked to the nozzle(s) 15. If through the light 109 air is not fed (for example by closing a valve upstream, placed inside the machine 1), the milk heated by the steam in pressure but not emulsified is supplied through the duct 111, the whole as known on itself.

In the embodiment illustrated in FIGS. 13 to 22, characteristically the feeding duct 21 is housed inside a tube 201 extending from the inside of the refrigerated compartment 11 as far as the sucking or emulsifying member 31. In some embodiments, the tube 201 is made of a material with high thermal conductivity and low thermal capacity, typically metal, for example copper, steel or aluminium. The tube 201 has one end 201A connected to the sucking or emulsifying member 31 and one end 201B inserted inside of a joint 203 fixed in the way described hereinafter inside of the refrigerated compartment 11.

The joint 203 has an inlet 203A wherein the tube 201 is fixedly inserted in a reversible way, that is with a sufficient interference to guarantee a mechanical and thermal contact between the tube 201 and the inner surface of the portion 203A of the joint 203, but sufficiently limited to allow inserting and extracting through a manual operation the tube 201 in the end or portion 203A of the joint 203, without the need for tools. Moreover, the joint 203 has a second portion 203B which branches from an extension 203C of the joint 203 axially aligned to the portion 203A. The portion 203B defines a passage 203D therethrough the milk feeding duct 21 outgoes to insert inside the tank 13. In substance, then, the milk feeding duct 21 extends from the inside of the refrigerated volume 11 within the passage 203D defined by the portion 203B of the joint 203, through the portion 203A of the joint 203C and along the tube 201 as far as reaching the sucking or emulsifying member 31.

Figure 22:
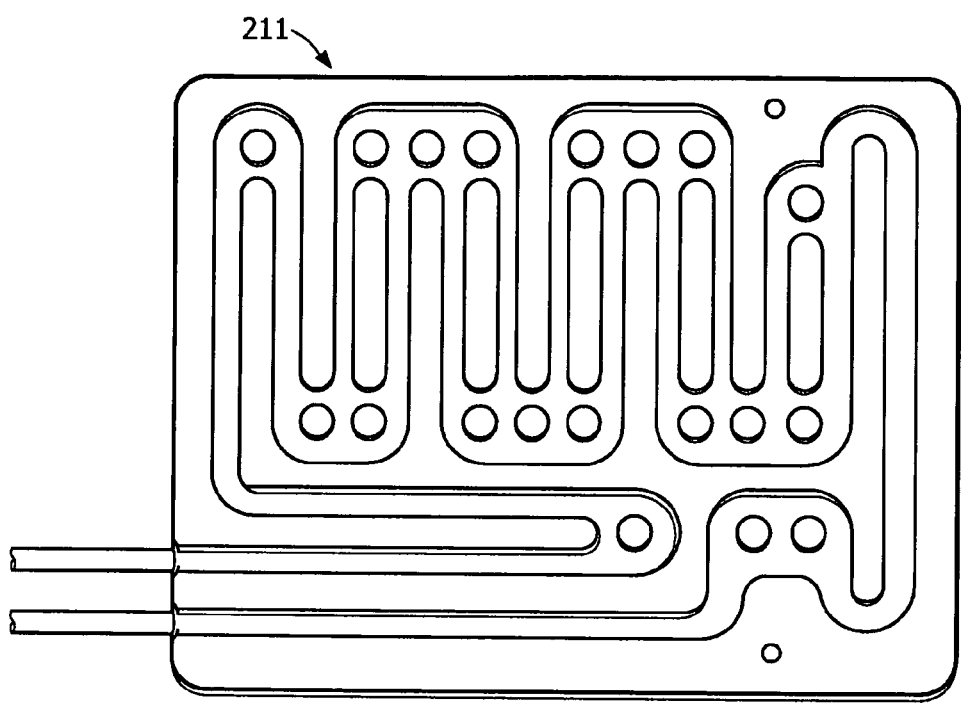
FIG. 22 shows schematically a panel forming a coil for circulating the refrigerating liquid of the refrigerated compartment.

In some embodiments, the main portion 203C of the joint 203 has a threaded end 203E wherein a screw cap 205 can be applied. This configuration is illustrated for example in FIG. 19. The portion 203C, in turn, is inserted in a seat 207 integral to a plate 209. The seat 207 advantageously has a cylindrical cavity wherein the portion 203C of the joint 203 inserts with interference so as to guarantee a thermal and mechanical contact between the outer surface of the portion 203C of the joint 203 and the inner surface of the seat 207. The plate 209 in mechanical and thermal contact with the wall defining the refrigerated compartment 11. Inside this wall there is the coil 211 of the evaporator of the refrigerating fluid used to cool down the refrigerated compartment 11. FIG. 22 shows a configuration example of this coil which can be implemented with known techniques. The circulation of the refrigerating tube inside the coil, downstream of the expansion valve of the refrigerating circuit (not shown), extracts heat from the wall delimiting the refrigerated compartment 11 and keeps the inside of this compartment at low temperature.

The mechanical connection guaranteed by the plate 209, by the seat 207, by the joint 203 and by the tube 201 allows for the refrigerating fluid circulating into the coil 211 to extract heat from the whole tube 201 and thus from the milk feeding duct 21, by keeping the duct 21 and the milk inside thereof at a low temperature even when the device 17 is not used, that is when the milk stands inside the feeding duct 21 between a supply cycle and the subsequent one. With the usual temperatures usually reached inside the coil 211 it has been found that the milk inside the feeding duct 21 is kept at a low temperature (2-5° C.) even when the device is at rest. This is advantageously obtained by implementing the components 209, 203, 201 in materials having adequate heat transmission features, for example copper, aluminium or alloys thereof or other preferably metallic materials.

Figure 16:
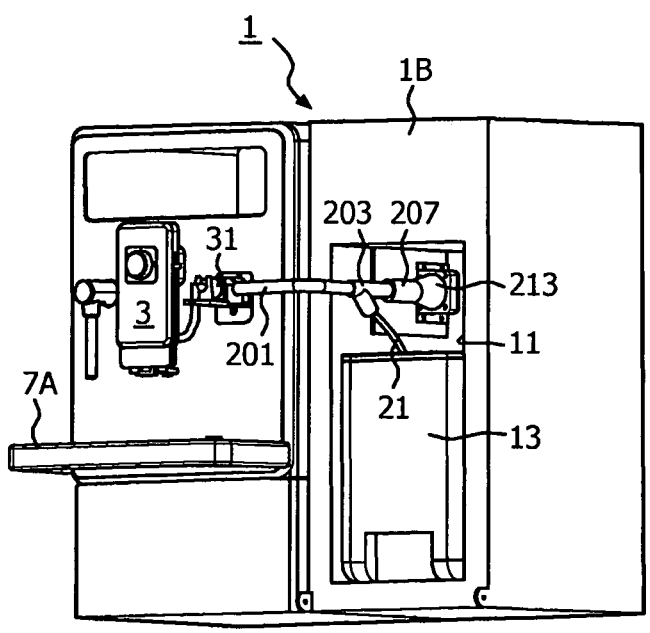
FIG. 16 shows the machine of FIGS. 13 to 15 with the removed refrigerated chamber.
Figure 17:
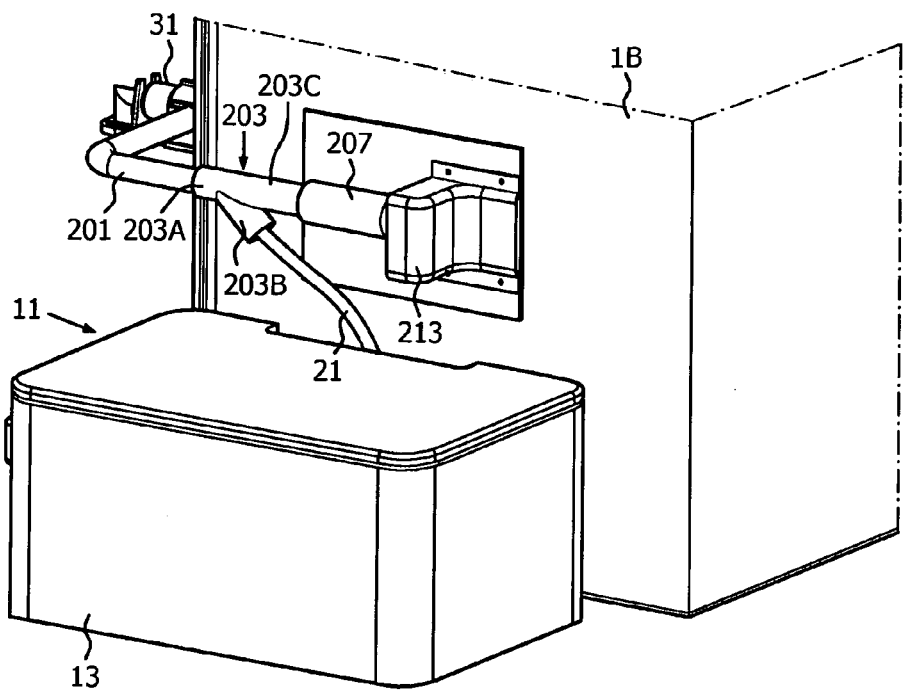
FIG. 17 shows a detail of the liquid feeding duct seen from the inside of the refrigerated compartment.
Figure 18:
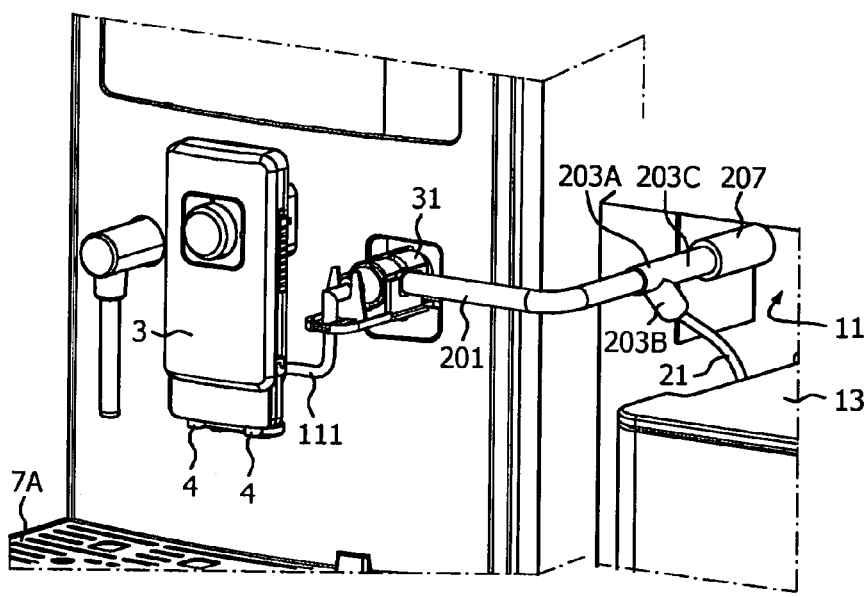
FIG. 18 shows an outer detail of the liquid feeding duct and of the tube wherein it is inserted, connected to the liquid sucking member.

In some embodiments, in order to improve the refrigerating effect inside the tube 201 and the feeding duct 21, refrigerated air is fed (which is picked up from the refrigerated compartment 11) inside the device 17, that is the refrigerated chamber contained inside such device and more in particular inside the hollow space between the milk feeding duct 21 and the tube 201 inside thereof the duct 21 is at least partially housed. To this purpose, as shown in the embodiments of FIGS. 16, 17 and 20, a housing 213, where a fan schematically designated with 215 is inserted, is applied to the plate 209.

The housing 213 defines (see in particular section of FIG. 21 and perspective view of FIG. 20) a passage 214 between the housing 213 and the plate 209. Through this passage 214 air from the inside of the refrigerated compartment 11 is sucked. This air, skimming the plate 209 in thermal contact with the refrigerated wall of the refrigerated compartment 11, inside thereof the coil 211 is inserted, reaches an extremely low temperature before being sucked by the fan 215 and be insufflated inside of the joint 203 in the hollow space between the tube 201 and the feeding duct 21.

Figure 20:
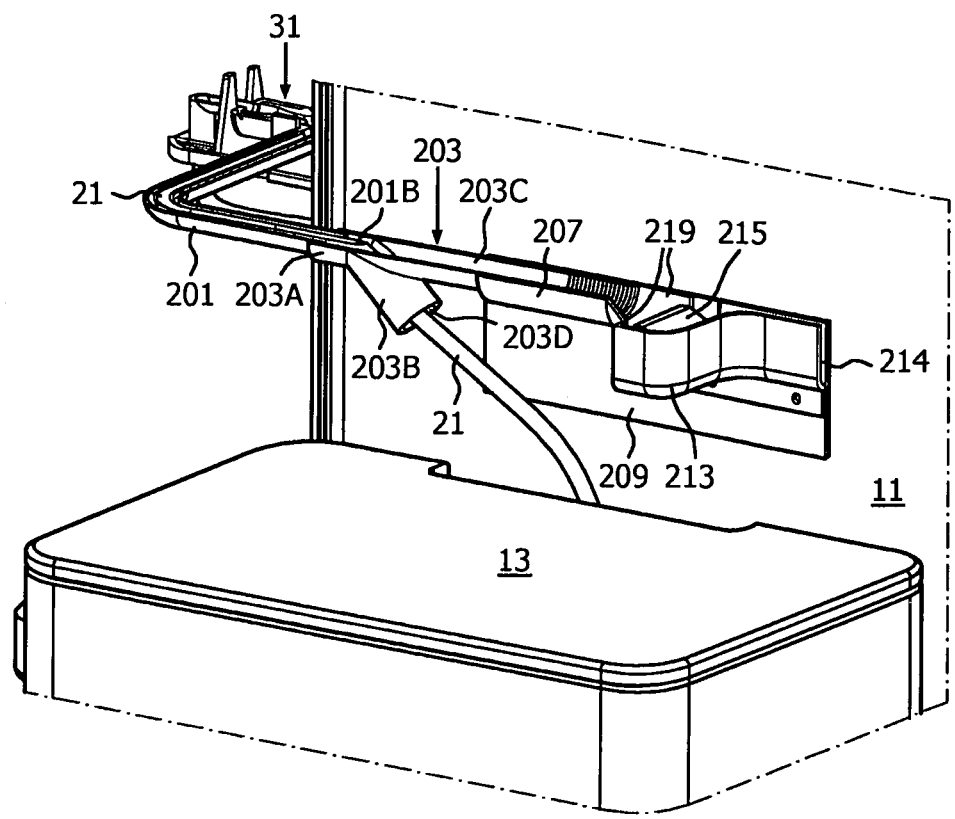
FIG. 20 shows a perspective view in section according to a horizontal plane of the liquid feeding duct from the inside of the refrigerated compartment.
Figure 21:
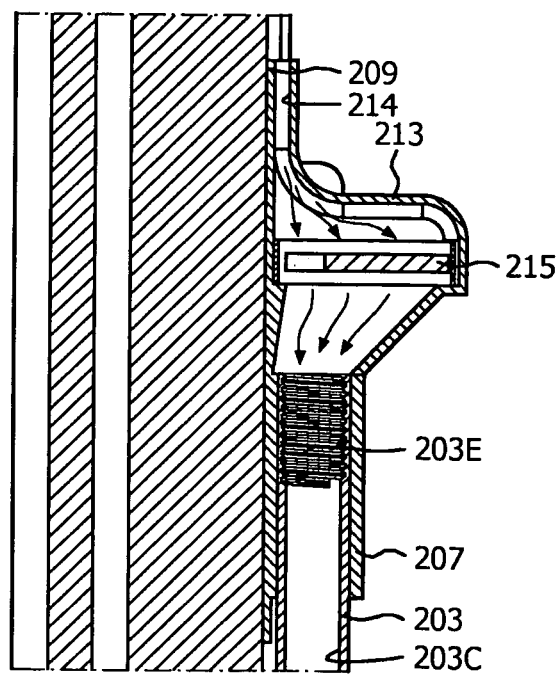
FIG. 21 shows a detail of the housing of the fan for feeding the refrigerated air in the embodiment of the FIGS. 13 to 20.

As shown in particular in FIGS. 20 and 21 the portion 203C of the joint 203 also in this case has an ending thread 203E which can be used to apply the cap 205, so as to be able to use the same component alternatively in combination with the closing tap 205 or with the fan 215.

Figure 14:
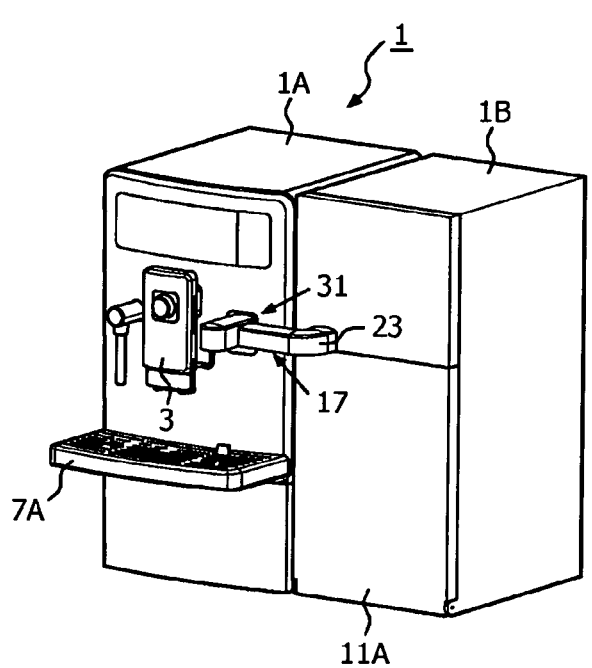
Figure 15:
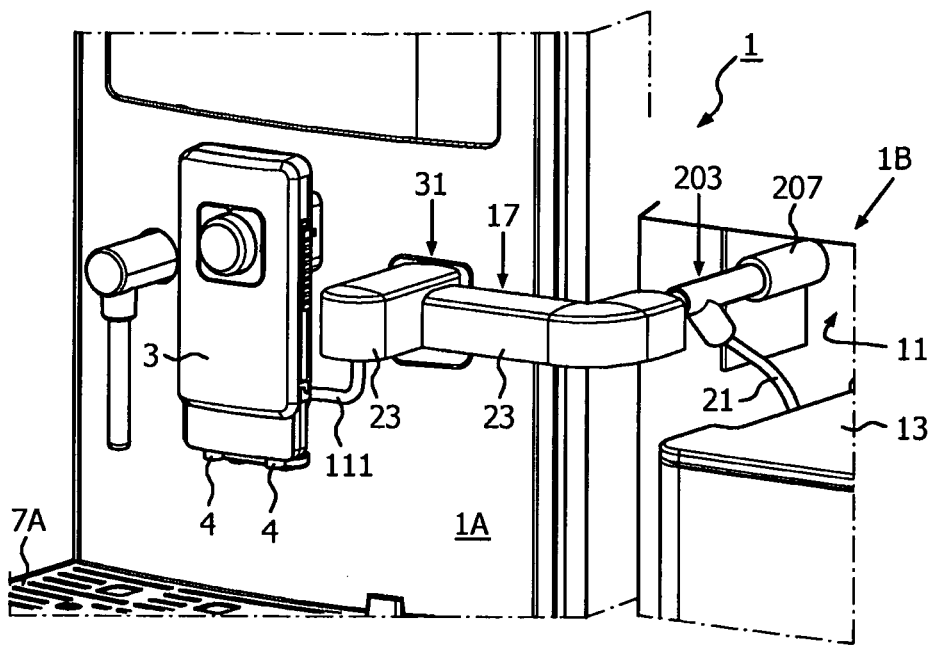
FIG. 15 shows a detail of FIG. 14 with the open refrigerated compartment.

In some embodiments, as shown in particular in FIGS. 13 to 15, the tube 201 containing the feeding duct 21 as well as the sucking or emulsifying member 31 are enclosed inside a shell formed by shaped walls made of plastic material defining a refrigerated chamber still designated with 23 as in the previously illustrated embodiment.

It is to be meant that the drawing shows only an exemplification given only as practical demonstration of the invention, which can vary in the forms and arrangements still within the scope of the concept underlying the invention. The possible presence of reference numbers in the enclosed claims aims at facilitating reading the claims with reference to the description and the drawing and it does not limit the protection scope represented by the claims.

The invention claimed is:

1. A machine for producing a drink, comprising:
   a supplier having a supplying spout configured to supply the drink;
   a refrigerated compartment to house a liquid; and
   a connection device between the refrigerated compartment and at least a supply nozzle for supplying the liquid picked up from said refrigerated compartment to the supplier,
   wherein the connection device comprises a liquid feeding duct having a first end for inletting the liquid and a second end associated to said supply nozzle, said liquid feeding duct being housed at least partially in a refrigerated chamber, and a thermally insulated outer housing that includes said refrigerated chamber, wherein the liquid feeding duct extends in the thermally insulated outer housing,
   wherein the refrigerated compartment comprises a door and a liquid sucking tube, the door being openable and closable, the door being opened by inserting the first end of the liquid feeding duct of the connection device into the door, the liquid sucking tube being removably connected to said liquid feeding duct, and the liquid sucking tube being connected to the first end of the liquid feeding duct when the door is opened, and
   wherein the connection device is coupled into to the refrigerated compartment when the door is opened and the liquid sucking tube is connected to the first end of the liquid feeding duct.

2. The machine according to claim 1, wherein said refrigerated compartment comprises a circuit for a refrigerating fluid in thermal contact with said connection device.

3. The machine according to claim 2, wherein said liquid feeding duct is housed at least partially in a tube in direct or indirect thermal contact with said circuit for the refrigerating liquid.

4. The machine according to claim 3, wherein said tube is made of material with high thermal conductivity.

5. The machine according to claim 3, wherein said tube is coupled to a joint comprising a passage for the liquid feeding duct, in communication with said refrigerated compartment, and a projection in direct or indirect thermal contact with said circuit for the refrigerating fluid.

6. The machine according to claim 5, wherein said tube and said joint are connected to a reversible fixing coupling.

7. The machine according to claim 1, wherein said connecting device comprises a device for inletting refrigerated air from the refrigerated compartment in said connection device.

8. The machine according to claim 3, wherein said tube is associated to a device for inletting refrigerated air from said refrigerated compartment in a hollow space between said tube and said liquid feeding duct.

9. The machine according to claim 5, wherein said projection of the joint is coupled to a housing of a fan for inletting refrigerated air from said refrigerated compartment in said joint and in said tube.

10. The machine according to claim 1, wherein said refrigerated chamber is open at least at the first end inletting the liquid of said liquid feeding duct.

11. The machine according to claim 1, wherein said liquid feeding duct is in a flow connection with a sucking member having an inlet for feeding steam and a mixing chamber, the inlet being connected to a nozzle for supplying the steam from said machine, and the mixing chamber mixing the steam with the liquid fed along said liquid feeding duct.

12. The machine according to claim 3, wherein said liquid feeding duct is in a flow connection with a sucking member having an inlet for feeding steam and a mixing chamber, the inlet being connected to a nozzle for supplying the steam from said machine, and the mixing chamber mixing the steam with the liquid fed along said liquid feeding duct, and wherein said tube extends from the refrigerated compartment to the sucking member.

13. The machine according to claim 11, wherein said sucking member further comprises an emulsifying air inlet.

14. Machine according to claim 1, further comprising a member for at least partial closure the liquid feeding duct.

15. The machine according to claim 14, wherein said supply nozzle and said liquid feeding duct are configured to have at least two distinct mutual angular positions, a mutual rotation of said supply nozzle and said liquid feeding duct causing the at least partial closure of the liquid feeding duct.

16. The machine according to claim 15, wherein said mutual rotation causes opening and closing of a flow interception member through said liquid feeding duct.

17. The machine according to claim 11, wherein said liquid feeding duct and said supply nozzle are mutually connected approximately at the sucking member.

18. The machine according to claim 17, wherein said liquid feeding duct and said supply nozzle are configured to have three different mutual angular positions to perform respectively a liquid supply, a washing of the supply nozzle, and a washing of the liquid feeding duct.

19. The machine according to claim 1, further comprising a discharge collector having an inlet opening interfacing with said supply nozzle, and having a discharge opening interfacing with a collection container.

20. The machine according to claim 1, wherein the door is closed by a spring placed onto an oscillating axis of the door when the connection device is not coupled into the refrigerated compartment, and wherein the door is opened by oscillation of the door inwards around the oscillating axis into the refrigerated compartment when the connection device is coupled into the refrigerated compartment.

21. A machine for producing a drink comprising:
- a supplier configured to supply the drink from a supplying spout;
- a refrigerated compartment to house a liquid; and
- a connection device between the refrigerated compartment and at least a supply nozzle for supplying the liquid picked up from the refrigerated compartment to the supplier,
- wherein the connection device comprises:
  - a liquid feeding duct having a first end inletting the liquid and a second end associated to the supply nozzle;
  - a thermally insulated outer housing that includes the refrigerated chamber, wherein the liquid feeding duct extends in the thermally insulated outer housing;
  - a thermally insulated chamber that includes the liquid feeding duct, wherein the thermally insulated chamber has thermally insulating walls made of an insulated material having a low thermal conductivity; and
  - a plate forming a thermal flywheel between the thermally insulated chamber and the liquid feeding duct.

22. The machine according to claim 21, wherein the liquid feeding duct is made of material having a high thermal transmission coefficient, and wherein an inside of the thermally insulated chamber is filled with cold air, cooled in the refrigerated compartment, when the thermally insulated chamber is in connection with an inside of the refrigerated compartment.

23. A machine for producing a drink comprising:
- a supplier configured to supply the drink from a supplying spout;
- a refrigerated compartment to house a liquid; and
- a connection device between the refrigerated compartment and at least a supply nozzle for supplying the liquid picked up from the refrigerated compartment to the supplier,
- wherein the connection device has a longitudinal axis and comprises:
  - a liquid feeding duct having a first end inletting the liquid and a second end associated to the supply nozzle, the liquid feeding duct being housed at least partially in a refrigerated chamber;
  - a thermally insulated outer housing that includes the refrigerated chamber, wherein the liquid feeding duct extends in the thermally insulated outer housing;
  - a first portion, inside thereof the second end of the liquid feeding duct associated to the supply nozzle extends;
  - a second portion, inside thereof the first end of the liquid feeding duct inletting the liquid extends; and
  - an emulsifier positioned between the first portion and the second portion, and
- wherein the first portion rotates about a rotation axis which is perpendicular to the longitudinal axis between a washing position and a liquid supply position.

24. The machine according to claim 23, further comprising:
- an intercepting member actuated by rotation of the first portion into the washing position, wherein the intercepting member closes a flow connection between the first end of the liquid feeding duct and the emulsifier; and
- a discharge collector having an inlet opening and a discharge opening, wherein the first portion rotates to a position above the inlet opening of the discharge collector in the washing position; and
- a collecting basin interfacing with the discharge opening.

25. The machine according to claim 24, wherein the intercepting member is located at the first end of the liquid feeding duct.

* * * * *